United States Patent [19]
Avery

[11] Patent Number: 5,615,074
[45] Date of Patent: Mar. 25, 1997

[54] ELECTROSTATIC PROTECTION CIRCUIT

[75] Inventor: Leslie R. Avery, Flemington, N.J.

[73] Assignee: David Sarnoff Research Center, Inc., Princeton, N.J.

[21] Appl. No.: 516,072

[22] Filed: Aug. 17, 1995

Related U.S. Application Data

[63] Continuation-in-part of Ser. No. 291,809, Aug. 17, 1994.
[51] Int. Cl.$^6$ ...................................................... H02H 9/06
[52] U.S. Cl. ............................... 361/56; 361/91; 361/111
[58] Field of Search .............................. 361/56, 91, 111, 361/119

[56] References Cited

U.S. PATENT DOCUMENTS

| | | | |
|---|---|---|---|
| 3,886,432 | 5/1975 | Piccone et al. | 361/56 |
| 4,066,918 | 1/1978 | Huener et al. | 361/56 |
| 4,323,942 | 4/1982 | Hartmen et al. | 361/56 |
| 4,405,933 | 9/1983 | Avery | 357/13 |
| 4,484,244 | 11/1984 | Avery | 361/56 |
| 5,010,380 | 4/1991 | Avery | 357/23.13 |
| 5,072,273 | 12/1991 | Avery | 357/38 |
| 5,274,262 | 12/1993 | Avery | 257/362 |
| 5,343,053 | 8/1994 | Avery | 257/173 |

*Primary Examiner*—Todd E. DeBoer
*Attorney, Agent, or Firm*—William J. Burke

[57] ABSTRACT

An ESD protection circuit includes a portion for protecting a pair of power lines and a portion for protecting an input/output pin. The power line protection portion includes at least three SCRs electrically connected in series between the power lines. A zener diode is electrically connected between a gate of the SCR at one end of the series and the negative power line, and a resistor is electrically connected between the gate of the one SCR and the positive power line. The gates of the other SCRs in the series are electrically connected to the negative power line or to their own cathode. The I/O pin protection portion includes a plurality of SCRs connected in series between the power lines with the I/O pin being connected between the SCR at one end of the series and the next adjacent SCR in the series. A separate zener diode is electrically connected between the gate of the SCR at the one end of the series and the gate of the next adjacent SCR and the negative power line. A separate resistor is connected between the gate of the SCR at the one end of the series and the next adjacent SCR and the positive power line. The gates of the other SCRs in the series are connected to the negative power line or to their own cathode.

7 Claims, 4 Drawing Sheets

5,615,074

ELECTROSTATIC PROTECTION CIRCUIT

This application is a continuation-in-part application of co-pending U.S. patent application Ser. No. 08/291,809 filed Aug. 17, 1994.

The invention is directed to an electrostatic (ESD) protection circuit for an integrated circuit (IC), and, more particularly to an ESD protection circuit for the power supply and input/output (I/O) connections of a low voltage submicrometer IC.

BACKGROUND OF THE INVENTION

As ICs have increased in size to include larger number of circuit elements, the geometry of the circuit elements has decreased in order to maintain the overall size of the IC relatively small. With decreasing geometries of the circuit elements, providing adequate levels of ESD protection has become increasingly more difficult. In MOS circuits the gate oxide thickness has decreased to below 10 nanometers (nm), and breakdown voltages are often less than 10 volts (V). Fowler Nordheim (FN) tunneling through the oxide can occur as low as 7 V. Device junction breakdown voltages, which are often used to protect the sensitive gate oxide directly, or to trigger a protection structure such as a snap-back device, have remained high to minimize hot carrier generation. In many cases, the minimum junction breakdown voltage is above the gate breakdown voltage. Supply voltages have also been reduced. For circuit devices having geometries down to 0.8 micrometers (μm), supply voltages have been held at 5 V. However, below that level, either dual supply (5 V and 3.3 V) supplies 3.3 V supply has been used. The 3.3 V supply can be as high as 4.5 V for burn-in.

Lower voltage clamping or triggering structures, such as zener diodes, have been used for ESD protection. Such devices have been made using the lightly doped drain (LDD) diffusions and heavier source/drain diffusions of the MOS transistors of the IC to form zener diodes in the 6–8 V range. However, since FN tunneling occurs around 7 V, these zener diodes do not provide adequate I/O and gate protection for large ESD pulses if used to trigger larger energy handling circuits. Lower voltage zener diodes cannot be easily made without adding additional process steps, and would tend to be leaky due to band to band tunneling.

Attempts have been made to provide ESD protection using a series of stacked diodes. However, these suffer from a basic problem relating to the temperature coefficient of the diodes. The temperature coefficient of a single diode is about −2 milliVolts/°C. (mV/°C.). Over the normal operating temperature range of −55° C. to 125° C., the change in voltage is about 140 mV. For a ten diode stack, the change would be 1.4 V. This change is sufficient to make a compromise between low leakage at high temperatures and adequate voltage protection margin at low temperature virtually impossible. Therefore, an alternate approach is necessary.

SUMMARY OF THE INVENTION

The invention is directed to an ESD protection circuit which includes a pair of power lines and a plurality of silicon controlled rectifiers (SCRs) electrically connected in series between the power lines. Each of the SCRs has a gate, and a zener diode is electrically connected between the gate of the SCR at one end of the series and one of the power lines. The gates of the other SCRs in the series are electrically connected to the one power line.

The invention is also directed to an ESD protection circuit which includes a pair of power lines and an input/output (I/O) pin. A first plurality of SCRs are electrically connected in series between the power lines. A second plurality of SCRs are electrically connected in series between the power lines with the input/output (I/O) pin being connected between the SCR at one end of the second series and the next adjacent SCR. Each of the SCRs of the first and second series has a gate, a cathode and an anode. A separate zener diode is electrically connected between the gate of the SCR at one end of each of the first and second series and one of the power lines. The gates of the other SCRs of each of the first and second series are electrically connected to the one power line.

BRIEF DESCRIPTION OF THE DRAWING

The teachings of the invention can be readily understood by considering the following detailed description in conjunction with the accompanying drawings, in which.

DETAILED DESCRIPTION

Figure 1:
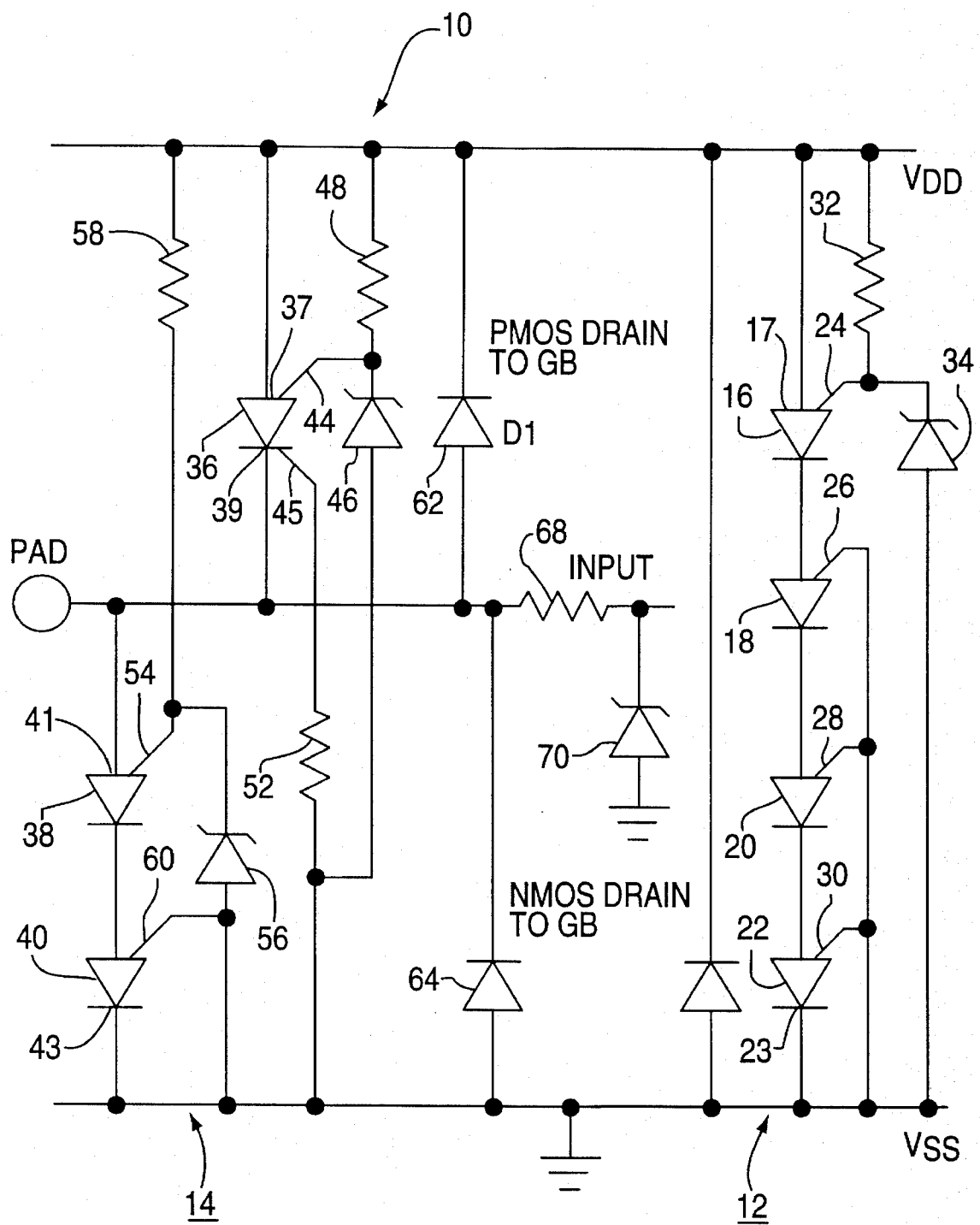
FIG. 1 is a circuit diagram of the ESD protection circuit of the invention.

For protection against damage from an electrostatic (ESD) event in normal ICs, it is necessary to protect all input, output and input/output (collectively I/O) pins, plus all power supply pins. For several reasons the I/O pins are usually more sensitive to ESD than the power supply pins, requiring lower trigger and clamping voltages. In FIG. 1, an ESD protection circuit 10 of the invention is shown. In circuit 10, the power supply protection circuit 12 provides ESD protection for the power supply pins, and the I/O pin protection circuit 14 provides ESD protection for the I/O pins.

The circuit 12 comprises a plurality of series connected SCRs between the power lines Vss and Vdd. As shown, there are four of the series connected SCRs, 16, 18, 20 and 22 with the anode 17 of the SCR 16 at one end of the series being connected to the positive power line Vdd and the cathode 23 of the SCR 22 at the other end of the series being connected to the negative power line Vss. However, the series of SCRs could include more or less than four depending on the power supply requirements. The lower three SCRs 18, 20 and 22, have their second gates, 26, 28 and 30 respectively, connected to the negative power line Vss so as to turn the SCRs 18, 20 and 22 on. The first gates (not shown) of the SCRs 16, 18, 20 and 22 are connected to ground. The SCR 16 at the top end of the series has its second gate 24 connected to the positive power supply line Vdd through a resistor 32. This effectively keeps the top SCR 16 in an off state. A small low voltage zener diode 34, usually about 6 V, is connected between the second gate 24 of the top SCR 16 and the negative supply line Vss or ground.

In the normal operation of the protection circuit 10, the top SCR 16 is off and only a small leakage current, usually less than one nanoampere, flows through the zener diode 34. Also, the lower SCRs 18, 20 and 22 are on. When a transient voltage is applied to the supply line Vdd, the zener diode 34 holds the second gate 24 of the top SCR 16 at the voltage of the zener diode 34. As soon as the anode voltage of the top SCR 16 exceeds the voltage at the second gate 24 by a Vbe, approximately 0.6 V, the top SCR 16 turns on and the transient voltage is clamped at approximately 1.3 times the voltage for every SCR 16, 18, 20 and 22 in the series.

Figure 3:
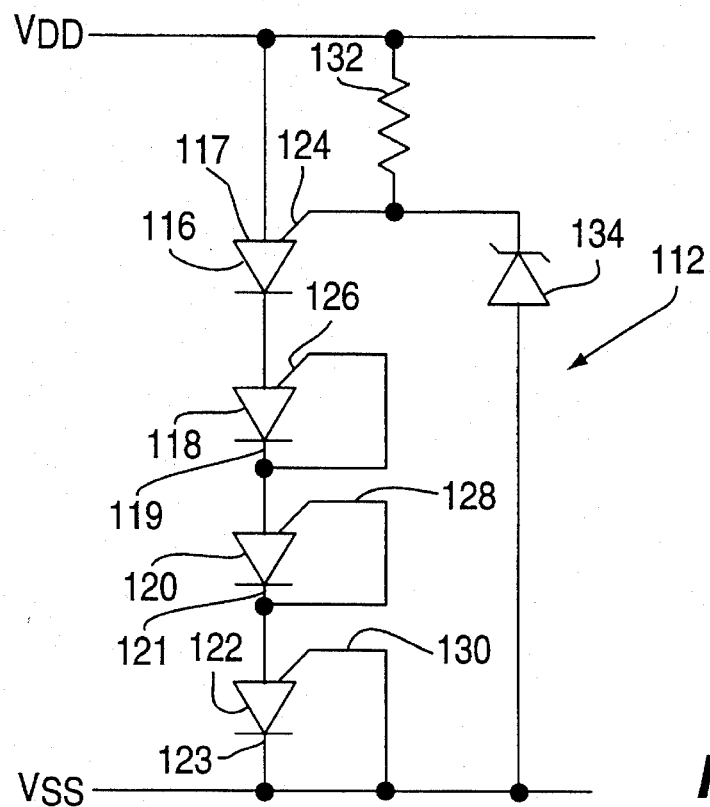
FIG. 3 is a modification of the power supply protection circuit of FIG. 1.

Referring to FIG. 3, a modification of the circuit 12 shown in FIG. 1 is generally designated as 112. Power supply protection circuit 112 includes a plurality of series connected SCRs 116, 118, 120 and 120 connected between the positive power line Vdd and the negative power line Vss. The SCR 116 at one end of the series has its anode 117 connected to the positive power line Vdd and its second gate 124 connected to the positive power supply line Vdd through a resistor 132. A low voltage zener diode 134 is connected between the second gate 124 of the SCR 116 and the negative supply line Vss or ground. The other three SCRs, 118, 120 and 122, each have their second gates 126, 128 and 130 respectively, connected to their own cathodes 119, 121 and 123 respectively. For the SCR 122 at the other end of the series, its cathode 123 and second gate 130 are also connected to the negative supply line Vss. Each of the other two SCRs 118 and 120 has its second gate 126 and 128 respectively connected to the negative supply line Vss through the adjacent SCRs in the series. The protection circuit 112 operates in the same manner as the protection circuit 12, described above, except that there is provided a lower leakage current between Vdd and Vss.

Figure 4:
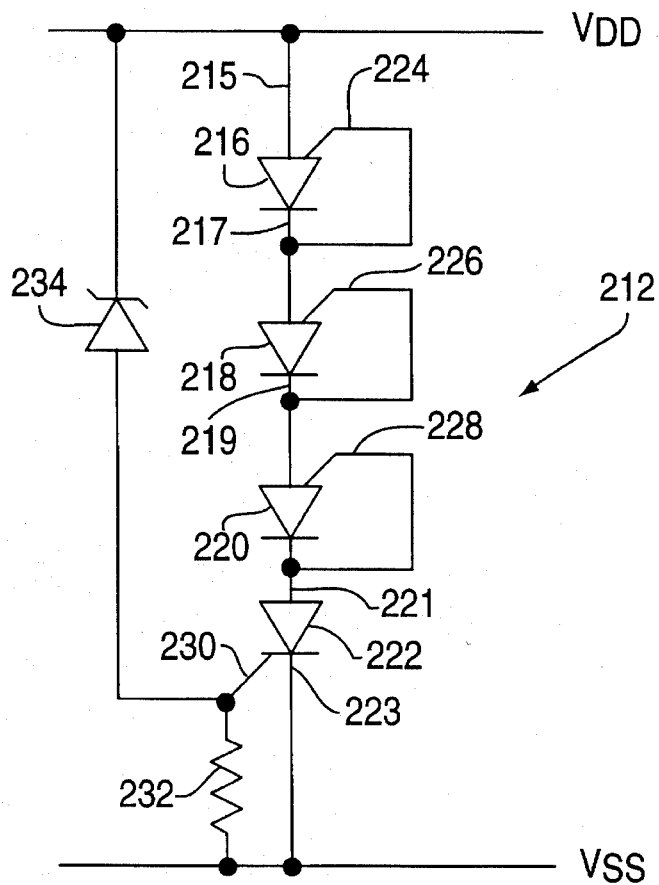
FIG. 4 is a further modification of the power supply protection circuit of FIG. 1.

Referring to FIG. 4 (simplified), a further modification of the circuit 12 shown in FIG. 1 is generally designated as 212. Power supply protection circuit 212 includes a plurality of series connected SCRs 216, 218, 220 and 222 connected between the positive power line Vdd and the negative power line Vss. The SCR 222 at one end of the series has its cathode 223 connected to the negative power line Vss and its first gate 230 connected to Vss through a resistor 232. A low voltage zener diode 234 is connected between the first gate 230 of the SCR 222 and the positive supply line Vdd. The other three SCRs, 216, 218 and 220, each have their second gates 224, 226 and 228 respectively, connected to their own cathodes 217, 219 and 221 respectively. For the SCR 216 at the other end of the series, its anode 215 is connected to the positive supply line Vdd. In IC form, where the first gate is a common P-type substrate, the first gates of SCRs 216, 218 and 220 are also connected to ground through the substrate resistance. The circuit 212 operates in the same manner as the protection circuit 112, described above, except that the zener trigger operates on the lower SCR. It is to be understood that other triggering means such as stacked diodes can be used in place of the zener diode trigger so long as the appropriate triggering voltage and speed are maintained.

The circuit 14 in FIG. 1 also comprises a plurality of SCRs, in this case three SCRs 36, 38 and 40. The SCR 36 at the top end of the series has its anode 37 connected to the positive supply line Vdd and its cathode 39 connected to the I/O pin 42. The bottom SCRs 38 and 40 are connected in series between the I/O pin 42 and the negative supply line Vss with the anode 41 of the SCR 38 being connected to the I/O pin 42 and the cathode 43 of the SCR 40 being connected to the negative power line Vss. Thus the three SCRs 36, 38 and 40 are connected in series between the supply lines Vdd and Vss with the I/O pin 42 being connected between the SCRs 36 and 38. The second gate 44 of the top SCR 36 is electrically connected to the negative line Vss through a zener diode 46 and is electrically connected to the positive line Vdd through a resistor 48. The first gate 45 of the top SCR 36 is also electrically connected to the negative power line Vss through a resistor 52. The second gate 54 of the second SCR 38 is electrically connected to the negative power line Vss through a zener diode 56 and is electrically connected to the positive power line Vdd through a resistor 58. The second gate 60 of the bottom SCR 40 is electrically connected directly to the negative power line Vss. The first gates (not shown) of the SCRs 38 and 40 are connected to ground. Additional protection may be provided for the MOS transistors of the IC being protected by diodes 62 and 64 connected between the drains of the PMOS and NMOS output transistors of the IC being protected and the associated power lines.

In the operation of the protection circuit 10, under normal operating conditions the SCRs 36, 38 and 40 are in the off state. As previously described, the first gate 45 of the SCR 36 is tied to the negative power line Vss by the resistor 52 and the cathode 39 of the SCR 36 biased between the power lines Vss and Vdd by the input/output signal. This keeps the SCR 36 in the off state. If the potential of the I/O pin 42 is taken negative with respect to the negative power line Vss by a negative input transient, such as an ESD pulse, then the SCR 36 turns on as soon as the input pulse falls approximately 0.6 V below the potential of the negative power line Vss, and clamps the I/O pin 42 to approximately 1.3 V below the voltage of the positive power line Vdd.

In a similar manner, the SCR 38 is off under normal circuit operation and is biased on when the potential at the I/O pin 42 exceeds the potential of the positive power line Vdd by about 0.6 V. This clamps the I/O pin 42 to approximately 2.6 V above the potential of the negative power line Vss (the series on voltage of SCRs 38 and 40). During normal operation of the circuit 14, the bottom SCR 40 is biased in the on state. Positive transients at the I/O pin 42 with the positive power line Vdd as common are clamped by the diode 62, which can either be formed by the parasitic diode from the drain of the PMOS output transistor to the N+guard band, or may be a separate diode. Negative transients at the I/O pin 42, with the negative power line Vss as common, are clamped by the diode 64, which can either be formed by the parasitic diode from the drain of the NMOS output transistor to the P+guard band, or may be a separate diode. Since the SCRs take a finite time of approximately 1 to 2 nanoseconds to reach the full low impedance on state, there may be a short overshoot transient at the I/O pin 42 which could damage the gate oxide of transistors connected directly to the I/O pin 42. This problem is overcome by the resistor 68 and zener diode 70 at the input. Also, the capacitance of the zener diode 70 and the transistors at the input serves to integrate the fast transient reducing rise time and amplitude. These components effectively clip the transient to a safe level before the SCRs fully turn on. When the SCRs are fully on, the voltage at the I/O pin 42 is lower than the voltage of the zener diode 70.

Figure 2:
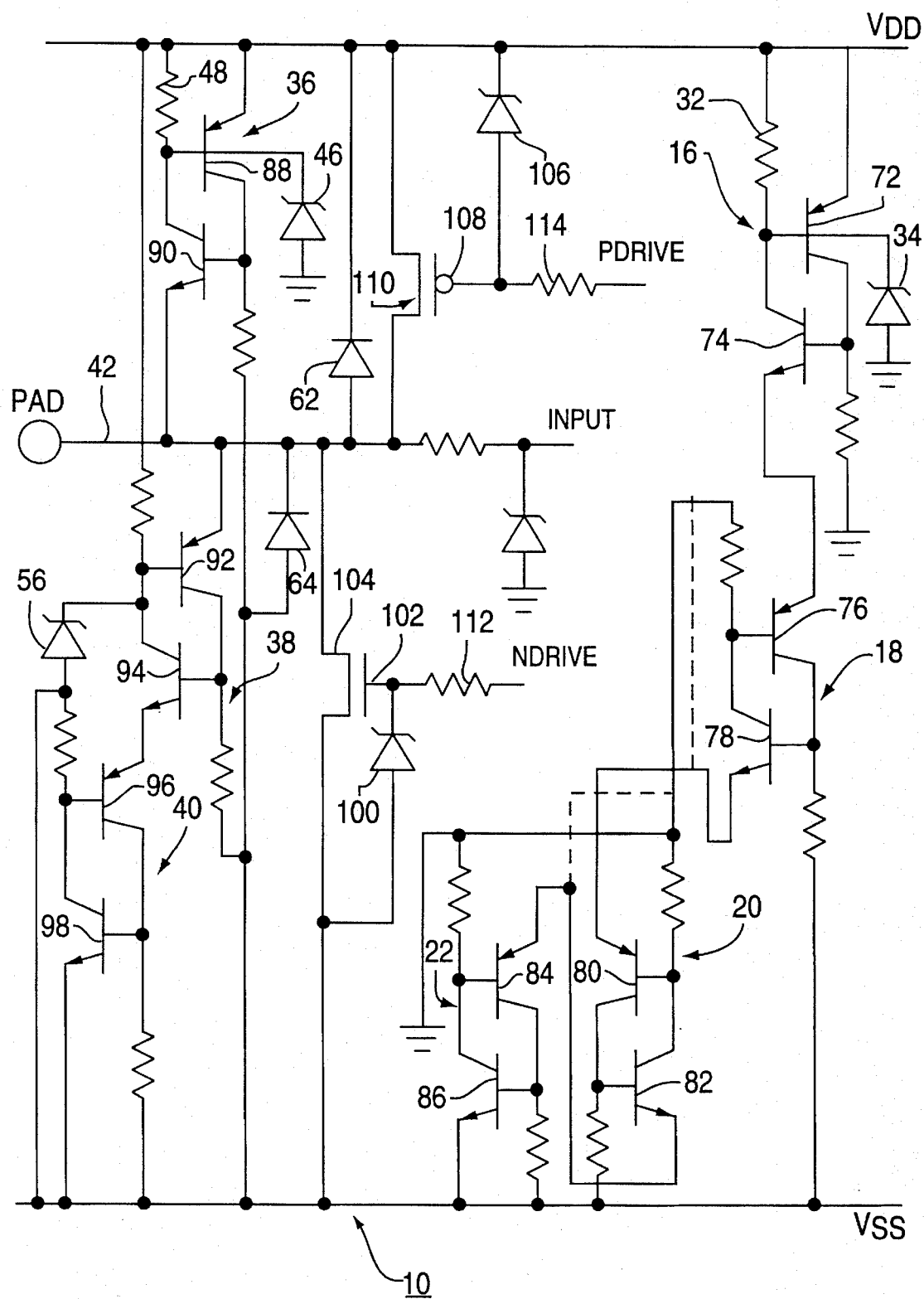
FIG. 2 is a circuit diagram showing the transistor equivalent of the circuit shown in FIG. 1.

The transistor equivalent to the circuit 10 shown in FIG. 1 is shown in FIG. 2. It is well known that an SCR can be represented by two bipolar transistors. Thus, in the circuit 12 portion of the protection circuit 10, the top SCR 16 if formed of two bipolar transistors 72 and 74. The other three SCRs 18, 20 and 22 are each made up of two bipolar transistors 76 and 78, 80 and 82 and 84 and 86 respectively. In the circuit 14 portion of the protection circuit 10, the top SCR 36 is made up of two bipolar transistors 88 and 90. The other two SCRs 38 and 40 are each made up of two bipolar transistors 92 and 94, and 96 and 98 respectively. In an IC, the various SCRs are constructed using four separate diffusions to form each SCR as a lateral SCR and not separate npn and pnp transistors. The various zener diodes are formed by using the lightly doped drain extensions diffusions of the MOS transistors of the circuit being protected and the heavier source/drain diffusions of the MOS transistors. These typically form a 6–7 V zener diode. In FIG. 2, the alternative manner of connecting the three SCRs 18, 20 and 22, shown in FIG. 3 is indicated by dash lines.

To handle the large differential voltages between the core logic and the I/O pins, which can occur with high ESD transients, it is necessary to add zener diode clamps to the gates of the output MOS transistors of the circuit being protected. As shown in FIG. 2, the optimum connection for these components includes connecting a zener diode 100 between the gate 102 of the NMOS transistor 104 and the negative power line Vss, and connecting a zener diode 106 between the gate 108 of the PMOS transistor 110 and the positive power line Vdd. For optimum protection, the zener diodes 100 and 106 should be located close to the transistors 104 and 110 respectively. The series resistors 112 and 114 are normally polysilicon, and may be placed anywhere between the driver circuit and the gate of the respective output device.

Figure 5:
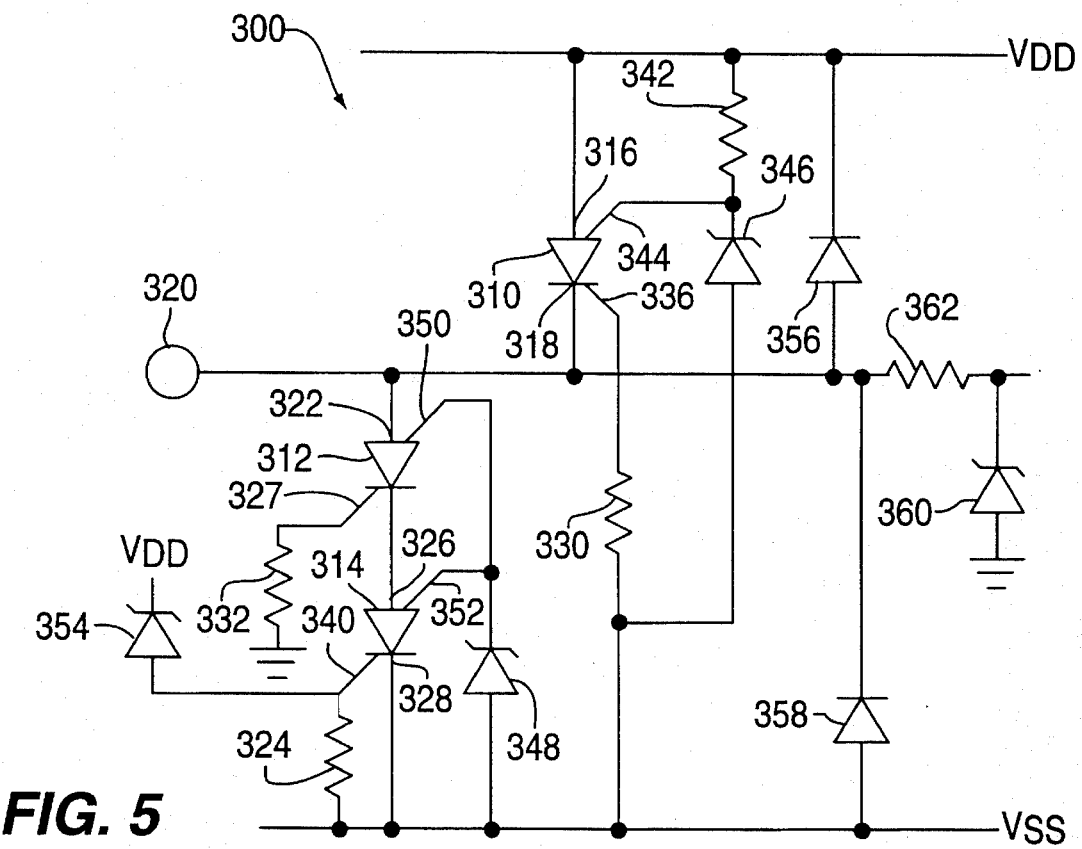
FIG. 5 is a circuit diagram of another form of the ESD protection circuit of the invention.

In FIG. 5, there is shown a protection circuit 300 which provides both power supply and I/O pad protection. Protection circuit 300 comprises three SCRs 310, 312 and 314 connected in series between power lines Vss and Vdd. The SCR 310 has its anode 316 connected to the power line Vdd and its cathode 318 connected to an I/O pin 320. The SCR 312 has its anode 322 connected to the I/O pin 320 and its cathode 324 connected to the anode 326 of the SCR 314. The cathode 328 of the SCR 314 is connected to the power line Vss.

As shown, each of the SCRs 310, 312, and 314 has a separate resistor 330, 332 and 324 respectively, connected between its first gate terminal 336, 327 and 340 respectively and the power line Vss. SCR 310 also has a resistor 342 connected between its second gate terminal 344 and the power line Vdd. A triggering zener diode 346 is connected between the second gate terminal 344 of the SCR 310 and the power line Vss. A triggering zener diode 348 is electrically connected between the second gate terminals 350 and 352 of the SCRs 312 and 314 and the power line Vss. A triggering zener diode 354 is connected between the first gate terminal 340 of the SCR 314 and the power line Vdd. A diode 356 is connected between the I/O pin 320 and the power line Vdd, and a diode 358 is connected between the I/O pin 320 and the power line Vss. The I/O pin 320 is also connected to a clamping zener diode 360 through a resistor 362.

Examining first the power supply protection of the circuit 300, if a transient is applied to the power supply terminal Vdd of sufficient amplitude, triggering zener diode 346 causes SCR 310 to turn on. This causes the cathode 318 of the SCR 310 to be clamped at about 1.5 to 2 V below the potential of the power supply Vdd. Similarly triggering zener diode 354 causes SCR 314 to turn on clamping its anode 326 at about 1 to 2 V above the source of reference potential Vss. Since the anode 322 of the SCR 312 is held at almost the same potential as the power supply Vss by the on state of the SCR 310, triggering zener diode 348 now causes the SCR 312 to turn on. Thus, all three SCRs 310, 312 and 314 are now turned on and the transient applied to the power supply line Vdd is clamped to the on voltage of the three SCRs 310, 312 and 314 in series. This is normally 4–6 V, depend in upon the design of the SCRs and the current through them. When the transient is finished and the voltage drops below the sum of the holding voltages of the three SCRs 310, 312 and 314, the SCRs turn off, returning to their normal non-conducting state.

Examining now the I/O protection of the circuit 300, if a negative transient is applied to the I/O pin 320 with respect to the source of reference potential Vss, the diode 358 turns on. This clamps the transient to about 1V below the source of reference potential Vss. Similarly, if a positive transient is applied to the I/O pin 320 with respect to the power supply Vdd, diode 356 turns on and clamps the transient to about 1V above the power supply Vdd. In both cases, the diodes 356 and 358 turn off when the transient is finished and the I/O potential returns within its normal operational range.

If a positive transient is applied to the I/O pin 320 with respect to the source of reference potential Vss, the triggering zener diode 348 causes SCRs 312 and 314 to be turned on. This clamps the transient to about 3 to 4 V above the source of reference potential Vss. When the transient is finished, and the potential at the pin 320 returns within its normal operational range, or the current through the SCRs 312 and 314 falls below the holding current, both SCRs 312 and 314 turn off.

Similarly, if a negative transient is applied to the pin 320 with respect to the power supply line Vdd, SCR 310 turns on when the potential at its cathode 318 goes approximately on Vbe (0.7 V) below the source of reference potential. This clamps the transient to about 1.5 V below the power supply terminal Vdd. When the transient is finished, SCR 310 turns off when the potential at the pin 320 is within the holding voltage of the SCR 310 or the current through the SCR 310 falls below its holding voltage.

The resistor 362 and the zener diode 360 serve as an additional transient filter to clamp transients to the gate of MOS devices to a safe level. This technique is well known in the art and is only shown to completeness.

Although circuit 300 is shown with two SCRs 312 and 314 connected between the pin 320 and the line Vss, under certain circumstances the SCR 312 and its related resistor 332 can be eliminated leaving only the SCR 314 and its related resistor 324 and zener diodes 348 and 354. Such an arrangement can be used for smaller geometry circuits with lower supply voltage, or those cases where the holding voltage of two SCRs in series is higher than the highest supply voltage nominally applied to the circuit.

Figure 6:
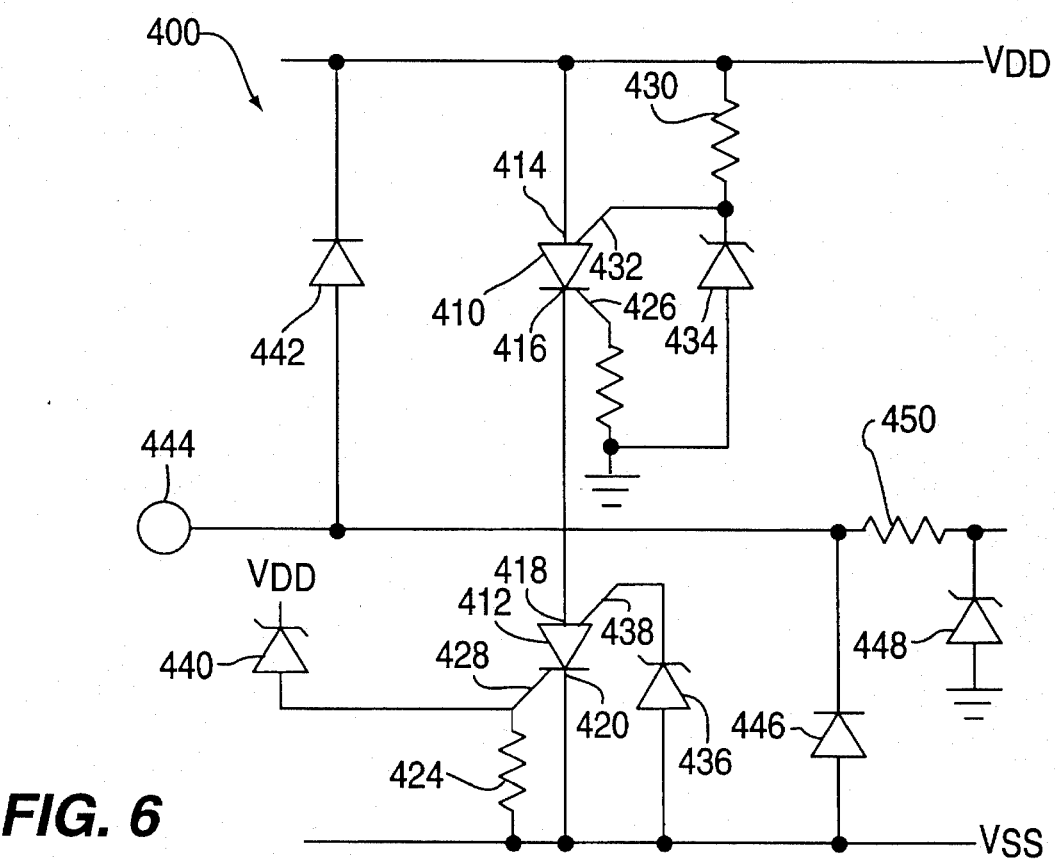
FIG. 6 is a modification of the circuit shown in FIG. 5.

In FIG. 6, the ESD protection circuit 400 is capable of providing both I/O and power supply protection, and is intended for used where there is limited space available in the I/O cell and the ESD protection has to rely on the power supply protection. As shown, there are two SCRs 410 and 412 connected between a source of reference potential Vss and a power supply terminal Vdd. However, more than two SCRs can be connected in series across the power supply terminals depending on the holding voltage of the series connected SCRs. In general, the holding voltage of the SCRs should be a little greater than the maximum allowed supply voltage.

The anode 414 of the SCR 410 is connected to the power supply terminal Vdd and the cathode 416 of the SCR 410 is connected to the anode 418 of the SCR 412 and I/O pin 444. The cathode 420 of the SCR 412 is connected to the reference potential Vss. A resistor 422 is connected between the first gate terminal 426 of the SCR 410 and the reference potential Vss, and a resistor 424 is connected between the first gate terminal 428 of the SCR 412 and the reference potential Vss. A resistor 430 is connected between the second gate terminal 432 of the SCR 410 and the power supply Vdd. A triggering zener diode 434 is connected between the second gate terminal 432 of the SCR 410 and the reference potential Vss, and a triggering zener diode 436 is connected between the second gate terminal 438 of the SCR 412 and the reference potential Vss. A triggering zener diode 440 is connected between the first gate terminal 428 of the SCR 412 and the power supply Vdd.

A diode 442 is connected between an I/O pin 444 and the power supply Vdd, and a diode 446 is connected between the pin 444 and the reference potential Vss. The pin 444 is also connected to a zener diode 448 through a resistor 450.

Under normal operation, the two SCRs 410 and 412 are in a nonconducting state and impose minimal loading on the power supply. However, examining first the power supply protection, if a transient is applied to the power supply Vdd of sufficient amplitude, triggering zener 434 causes SCR 410 to turn on. This causes the cathode 416 of SCR 410 to be clamped about 1.5 to 2 V below the potential of the power supply Vdd. Similarly, triggering zener 440 causes SCR 412 to turn on clamping its anode 418 to about 1 to 2 V above the reference potential Vss. Both SCRs 410 and 412 are now on and the transient applied to the power supply Vdd is clamped to the on voltage of the two SCRs in series. This is normally 3–5 V, depending upon the design of the SCRs 410 and 412 and the current through them. When the transient is finished and the voltage drops below the sum of the hold voltages of the SCRs 410 and 412, the SCRs turn off, returning to their normal non-conducting state.

Now examining the I/O protection, if a negative transient is applied to the pin 444 with respect to the reference potential Vss, diode 446 turns on. This clamps the transient to about 1 V below the reference potential Vss. Similarly, if a positive transient is applied to the pin 444, diode 442 turns on and clamps the transient to about a volt above the power supply Vdd. In both cases, the diode turn off when the transient is finished and the I/O potential returns within it normal operation range.

If a positive transient is applied to the I/O pin 444 with respect to the source of reference potential Vss, the triggering zener diode 436 causes SCR 412 to be turned on. This clamps the transient to about 1.5 to 2 V above the source of reference potential Vss. When the transient is finished, and the potential at the pin 444 returns within its normal operational range, or the current through the SCR 412 falls below the holding current, the SCR 412 turns off.

Similarly, if a negative transient is applied to the pin 444 with respect to the power supply line Vdd, SCR 410 turns on when the potential at its cathode 416 goes approximately on Vbe (0.7 V) below the source of reference potential. This clamps the transient to about 1.5 V below the power supply terminal Vdd. When the transient is finished, SCR 410 turns off when the potential at the pin 444 is within the holding voltage of the SCR 410 or the current through the SCR 410 falls below its holding voltage.

The resistor 450 and the zener diode 448 serve as an additional transient filter to clamp transients to the gate of MOS devices to a safe level. This technique is well known in the art and is only shown to completeness.

Thus, there is provided by the invention, a circuit for providing protection from ESD in an IC which protects both the power supply pins and the I/O pins. The protection for the power supply pins includes a plurality of SCRs connected in series between the power lines. The SCR at one end of the series has its second gate connected to the negative power line through a zener diode and the second gate of each of the other SCRs is connected directly to the negative power line. The protection circuit for the I/O pin includes a plurality of SCRs connected in series with one SCR being connected between the positive power line and the I/O pin and the other SCRs being connected in series between the I/O pin and the negative power line. The one SCR has its second gate connected to the negative power line through a zener diode and one of the other SCRs has its second gate connected to the negative power line through a zener diode and its first gate connected to the positive power line through a zener diode.

I claim:

1. An electrostatic (ESD) protection circuit comprising:

a pair of power lines, the power lines including a positive polarity line and a negative polarity line;

at least three silicon controlled rectifiers (SCRs) electrically connected in series between said power lines, each of said SCRs having a gate, a cathode and an anode;

a zener diode electrically connected between the gate of the SCR at one end of the plurality of SCRs connected in series and one of the power lines; and means electrically connecting the gate of each of the other SCRs in the series other than the one SCR at the one end of the series to said one power line, further comprising:

a resistor connected between the gate of the SCR at the one end of the series and the positive line;

an input/output pin electrically connected between the SCR at the one end of the series and the next adjacent SCR in the series; and a zener diode electrically connected between the gate of the next adjacent SCR in the series and the negative power line, wherein:

the gate of all of the SCRs are connected to the negative polarity line; and the anode of the SCR at the one end of the series is directly connected to the positive power line and the cathode of the SCR at the other end of the series is connected to the negative power line.

2. An electrostatic (ESD) protection circuit comprising:

a pair of power lines;

an input/output pin;

a first plurality of silicon controlled rectifiers (SCRs) electrically connected in series between the power lines;

a second series of SCRs electrically connected in series between the power lines with the input/output pin being connected between the SCR at one end of the second series and the next adjacent SCR;

each of the SCRs of the first and second series having a gate, a cathode and an anode;

a separate zener diode electrically connected between the gate of the SCR at one end of each of the first and second series and one of the power lines; and the gates of each of the other SCRs of each of the first and second series other than the one SCR at the one end of the series being electrically connected to the one power line, further comprising:

a resistor connected between the gate of the SCR at the one end of each of the series of SCRs and the positive power line, wherein:

the anode of the SCR at the one end of each of the series of SCRs is electrically connected to the positive power line and the cathode of the SCR at the other end of each of the series of SCRs is electrically connected to the negative power line;

there are at least three SCRs in each of the series of SCRs;

the gates of all of the other SCRs in the first series of SCRs are connected directly to the negative power line; and a zener diode is electrically connected between the gate of the SCR next adjacent the one SCR in the second series of SCRs and the negative line.

3. An electrostatic (ESD) protection circuit comprising:

a pair of power lines the power lines including a positive polarity line and a negative polarity line;

a plurality of silicon controlled rectifiers (SCRs) electrically connected in series between said power lines, each of said SCRs having a gate;

a zener diode electrically connected between the gate of the SCR at one end of the plurality of SCRs connected in series and one of the power lines;

means electrically connecting the gate of each of the other SCRs in the series other than the one SCR at the one end of the series to said one power line;

an input/output pin electrically connected between the SCR at the one end of the series and the next adjacent SCR in the series; and a triggering means electrically connected between a second gate of the SCR at the other end of the series and the positive polarity line, wherein:

the gate of all of the SCRs are connected to the negative polarity line.

4. The circuit of claim 3 further comprising a zener diode electrically connected between the negative polarity line and each of a second gate of each of the other SCRs in the series.

5. The circuit of claim 4 further comprising a first diode electrically connected between the input/output pin and the negative polarity line and a second diode electrically connected between the input/output pin and the positive polarity line.

6. An electrostatic (ESD) protection circuit comprising:

a pair of power lines, the power lines including a positive polarity line and a negative polarity line;

a plurality of silicon controlled rectifiers (SCRs) electrically connected in series between said power lines, each of said SCRs having a gate;

a zener diode electrically connected between the gate of the SCR at one end of the plurality of SCRs connected in series and one of the power lines;

means electrically connecting the gate of each of the other SCRs in the series other than the one SCR at the one end of the series to said one power line;

an input/output pin, a first diode electrically connected between the input/output pin and the negative polarity line and a second diode electrically connected between the input/output pin and the positive polarity line, wherein:

the gate of all of the SCRs are connected to the negative polarity line.

7. The circuit of claim 6 further comprising a trigger means between a first gate of the SCR at the other end of the series and the positive polarity line and a zener diode between a second gate of said SCR at the other end of the series and the negative polarity line.

* * * * *